(12) United States Patent
Hagen et al.

(10) Patent No.: US 9,939,094 B2
(45) Date of Patent: Apr. 10, 2018

(54) CONNECTION DEVICE FOR PIPE LINES

(71) Applicant: VOSS Automotive GmbH, Wipperfürth (DE)

(72) Inventors: Harald Hagen, Wipperfürth (DE); Adrian Klehr, Neunerade (DE); Jochem-Andreas Hess, Wipperfürth (DE)

(73) Assignee: VOSS AUTOMOTIVE GMBH, Wipperfurth (DE)

( * ) Notice: Subject to any disclaimer, the term of this patent is extended or adjusted under 35 U.S.C. 154(b) by 633 days.

(21) Appl. No.: 14/410,589

(22) PCT Filed: Apr. 26, 2013

(86) PCT No.: PCT/EP2013/058750
§ 371 (c)(1),
(2) Date: Dec. 23, 2014

(87) PCT Pub. No.: WO2014/000911
PCT Pub. Date: Jan. 3, 2014

(65) Prior Publication Data
US 2015/0145248 A1    May 28, 2015

(30) Foreign Application Priority Data
Jun. 26, 2012   (DE) .................. 20 2012 102 342 U

(51) Int. Cl.
*F16L 37/091*   (2006.01)
*F16L 37/098*   (2006.01)
*F16L 47/24*    (2006.01)

(52) U.S. Cl.
CPC ......... *F16L 37/0915* (2016.05); *F16L 37/091* (2013.01); *F16L 37/0985* (2013.01); *F16L 47/24* (2013.01)

(58) Field of Classification Search
CPC .... F16L 21/007; F16L 37/091; F16L 37/0915
(Continued)

(56) References Cited

U.S. PATENT DOCUMENTS

| 4,123,090 A | 10/1978 | Kotsakis et al. |
| 4,919,457 A * | 4/1990 | Moretti ............... F16L 37/0915 |
| | | 285/308 |

(Continued)

FOREIGN PATENT DOCUMENTS

| CN | 101329001 A | 12/2008 |
| EP | 0 160 559 A1 | 11/1985 |

(Continued)

OTHER PUBLICATIONS

European Patent Office, P.B. 5818 Patentlaan 2, NL-2280 HV Rijswijk, International Search Report of International Application No. PCT/EP2013/058750, dated Nov. 7, 2013, 3 pages.

*Primary Examiner* — Aaron M Dunwoody
(74) *Attorney, Agent, or Firm* — Eric J. Sosenko; Jonathan P. O'Brien; Honigman Miller Schwartz and Cohn LLP

(57) ABSTRACT

A connection device for pipe lines includes a connection element that has a receiving opening for a pipe line and a retainer element that stops the pipe line from being pulled out. The retainer element is designed as a spring-elastic toothed ring that has teeth distributed across a circumference and which extend radially inward at an incline and act against the pipe line. The toothed ring is mounted to have limited axial play. At the transition region between an outer circumferential region and the retainer teeth, the toothed ring interacts with a circumferential tilt edge such that the toothed ring can pivot about the tilt edge out of a position in which its outer circumferential region is pressed against a first, lower contact section and a second, upper contact (Continued)

section. The retainer teeth being able to be elastically deformed by bending.

16 Claims, 5 Drawing Sheets

(58) Field of Classification Search
USPC .................................................. 285/340, 39
See application file for complete search history.

(56) References Cited

U.S. PATENT DOCUMENTS

| | | | |
|---|---|---|---|
| 5,487,572 A | 1/1996 | Combot-Courrau et al. | |
| 5,692,784 A * | 12/1997 | Hama ................ | F16L 37/0915 285/105 |
| 7,900,973 B2 * | 3/2011 | Herberg ............... | F16L 13/142 285/104 |
| 2003/0006609 A1 | 1/2003 | Yates | |
| 2004/0137778 A1 * | 7/2004 | Mattheeuws ......... | F16L 33/227 439/352 |
| 2005/0035597 A1 | 2/2005 | Bamberger et al. | |
| 2010/0253064 A1 | 10/2010 | Le Quere | |
| 2011/0025054 A1 * | 2/2011 | Kluss ................. | F16L 37/0915 285/351 |
| 2012/0074695 A1 * | 3/2012 | Salehi-Bakhtiari . | F16L 37/0915 285/377 |

FOREIGN PATENT DOCUMENTS

| | | |
|---|---|---|
| EP | 0542003 A1 | 5/1993 |
| EP | 0 616 161 A1 | 9/1994 |
| EP | 1 199 506 A1 | 4/2002 |
| FR | 2 368 663 A1 | 5/1978 |
| JP | 2003-307290 A | 10/2003 |
| WO | 2011/099186 A1 | 8/2011 |

* cited by examiner

CONNECTION DEVICE FOR PIPE LINES

BACKGROUND

1. Field of the Invention

The present invention relates to a connection device for pipelines.

2. Description of Related Art

One such connection device is described in document EP 0 616 161 B1. The retaining element of this device is configured as a toothed ring that has a plurality of radial, tooth-like, retaining arms which are connected to each other via peripheral connection sections. This known design should provide that the toothed ring is mounted freely movable with its outer circumferential area inside the connecting element, such that the peripheral connection sections can be elastically deformed, so that each tooth as such is not deformed on insertion of the line end but can swivel around each of the two adjacent peripheral connection sections. This design consequently requires a movable mounting of the toothed ring that ensures freedom of movement in its external circumferential area. This free mobility, however, has the disadvantage that the line end to be inserted must be cut off at the end at an exact right angle, so that there is a uniform contact and deformation of the toothed ring all over the circumference on insertion. A diagonally cut pipe could lead to tilting of the toothed ring because of the undefined freedom of movement and thus to problems on insertion of the pipeline end.

The publication EP 0 160 559 B1 describes a similar pipe connection device in which a toothed or retention ring is likewise mounted so as to be freely movable in its outer circumferential area.

Another document, EP 1 199 506 A1, likewise describes such a connection device, wherein, in contrast to the above publications, the retaining element is held with its outer circumference area basically without axial clearance relative to the connecting element viewed in the direction of an insertion axis of the pipeline end, so that an elastic deformation only occurs in the area of the retaining teeth on insertion or removal of the line end. This clearance-free mounting of the outer circumferential area of the retaining element is associated in practice with a very high manufacturing cost.

All known designs explained above also have the disadvantage that they are only suitable for stable pipelines which can stand the radial retaining forces owing to their intrinsic dimensional stability.

SUMMARY

The underlying object of the present invention is to create a pipe connection device which is characterized by a simple embodiment with improved functional properties in terms of construction and manufacture.

The above object is attained by various alternative solutions and embodiments contained in the description below.

It should also be pointed out that the individual features respectively defined in the various embodiments can optionally be provided either as alternatives or in combination with each other.

Hence, according to the present invention, it is provided that a toothed ring is mounted with its outer circumferential area inside the connecting element with an axially limited freedom of movement defined by the axially opposed contact sections existing on both sides inside the connecting element, wherein the toothed ring interacts at the transition between the outer circumferential area and the retaining teeth with a tilting edge corresponding to the circumference provided inside the connecting element, such that on insertion of the line end via its contact with the retaining teeth the toothed ring can be swiveled around the tilting edge in a seesaw manner from a position pressed with its outer circumferential area against the first lower contact section in the direction of insertion until the outer circumferential area moves on the outer side against the direction of insertion with a minor plastic deformation toward a contact supported at the second axially opposed upper contact section, and an elastic bending deformation subsequently occurs in the area of the retaining teeth protruding radially inward in the area of the tilting edge. Thus, a special deformation of the toothed ring during the insertion is achieved by these measures according to the present invention. On insertion of the line end, the toothed ring, which is mounted axially movable with a defined and limited freedom of movement, is first pressed in the direction of insertion with its outer circumferential area against the first lower contact section inside the connecting element. The outer circumferential area of the toothed ring then lies parallel on the contact section formed by a radial, perpendicular surface relative to the insertion axis, which ends radially inward with the tilting edge. By further inserting the line end, an elastic torsional deformation from the outer to approximately central ring area of the toothed ring then virtually occurs in a first phase because of the tipping via the tilting edge according to the present invention, while an elastic deformation only occurs in the area of the retaining teeth protruding radially inward in the area of the tilting edge because the outer circumferential area is, on the one hand, virtually tensioned externally by a double contact at the second contact section, and, on the other hand, at the transition to the retaining teeth at the tilting edge according to the present invention. Therefore, the retaining teeth radially protruding inward over the tilting edge can basically still deform. Overall, an improved insertion behavior, almost insensitive to unavoidable tolerances is achieved by means of the measures according to the present invention. In addition, the toothed ring can also center itself automatically with respect to the line end because of the defined freedom of movement. Finally, the embodiment according to the present invention is also relatively insensitive to diagonally cut pipeline ends.

With respect to a second aspect of the invention, a support sleeve, arranged coaxially inside the receiving opening of the connecting element, is provided such that the line end can be slid onto the cylindrical outer surface of the support sleeve on insertion, wherein the support sleeve has a support section in the operating area of the retaining element and the support section has a wall thickness configured for the radial support of the line end against the radio retaining force, and wherein the support sleeve axially has a section with a reduced wall thickness at least on one side, in particular, however, on both sides of the support section to enlarge an effective inner flow cross-section. This special embodiment of the support sleeve according to the present invention on the one hand guarantees a good radial support of the line end even against higher radio retaining forces of the retaining element. Thus, the connection device according to the present invention is also suitable for such pipelines, or even hose lines, which are configured with less dimensional stability. On the other hand, good flow characteristics are guaranteed despite the support sleeve, whereby it is especially advantageous to configure the inner circumference of the support sleeve over the entire length like a Venturi nozzle.

BRIEF DESCRIPTION OF THE DRAWINGS

The invention will be explained in more detail below by means of a preferred exemplary embodiment illustrated in the drawings. They show.

It is noted that the same parts are designated with the same reference numerals in the different figures of the drawings.

DETAILED DESCRIPTION

With respect to the description below, it is expressly pointed out that the invention is not restricted to the exemplary embodiments, and thus not to all or several characteristics of described combinations of characteristics, but each individual partial characteristic of the/of each exemplary embodiment can also be fundamental to the present invention independently of all other partial characteristics described above and in association with the claims, as such or also in combination with any characteristics of another exemplary embodiment.

Figure 1:
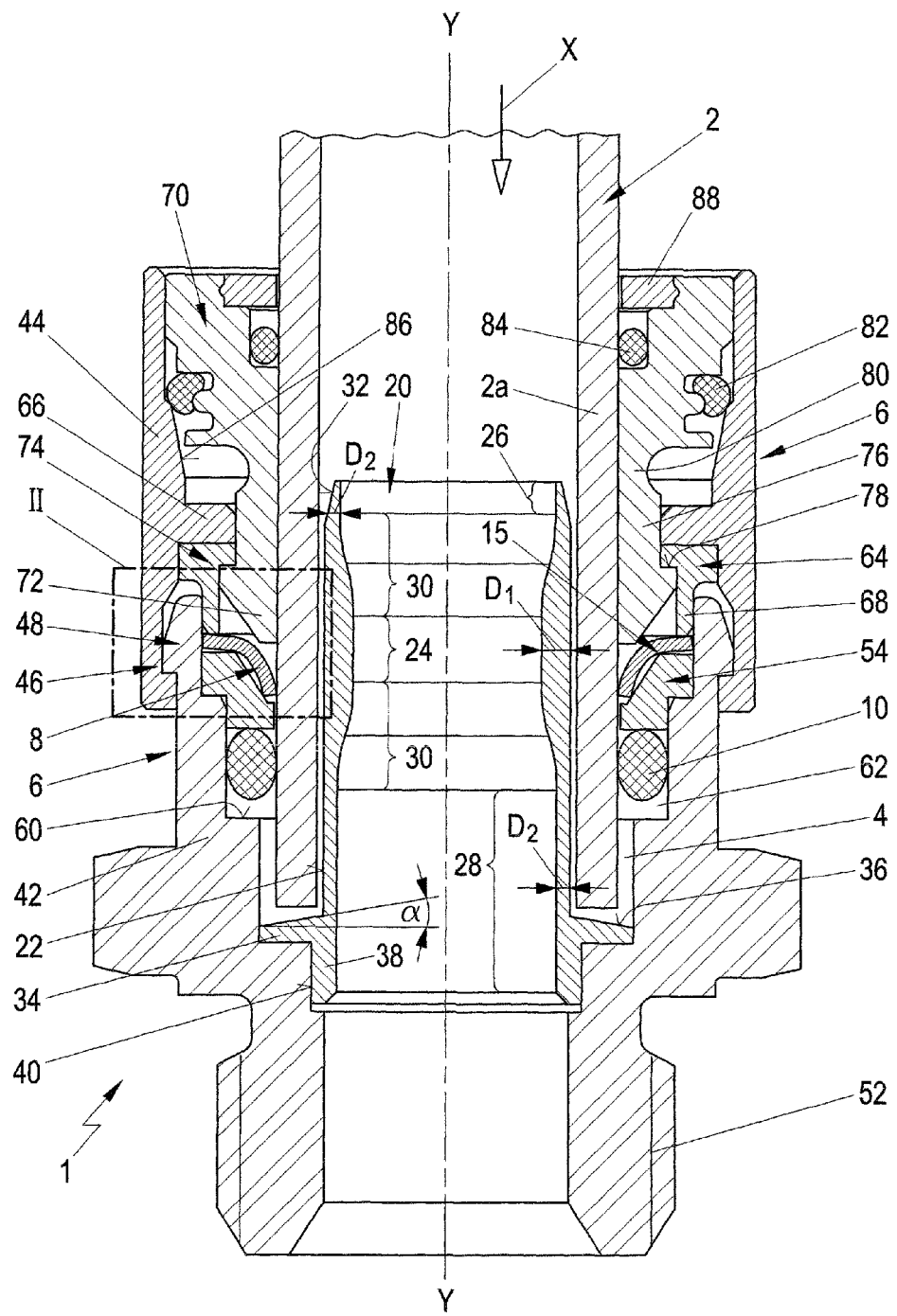
FIG. 1 is an axial sectional view of a connection device according to the present invention with an inserted pipeline end.

According to FIG. 1, the connection device 1 embodying the principles of the present invention serves for a quick and preferably detachable connection of a pipeline 2 by simply inserting a line end 2a into a receiving opening 4 of a connecting element 6. The direction of insertion is respectively shown with an arrow X in FIGS. 1 and 2. Since no connection mandrel is provided for the attachment of the pipeline 2, it is possible to speak of a "mandrel-free insertion system". A retaining element, which is configured as a spring-elastic toothed ring 8—see, in particular, the depictions in FIGS. 3 and 4—with an outer circumferential area 8a and having a plurality of retaining teeth 8b distributed over the circumference extending radially inward and at an angle in the direction of the direction of insertion X relative to the long axis Y and as a result acting frictionally and/or positively in a barb-like manner against the outer circumferential area of the line end 2a, is mounted inside the receiving opening 4 to lock the inserted line end 2a against any extraction. At least one circumferential seal 10 is also mounted inside the connecting element 6, which outwardly seals a radial annular gap relative to the long axis Y between the line end 2a and the connecting element 6, in order to outwardly seal the inserted pipeline 2.

The outer circumferential area 8a of the toothed ring 8 lies in a non-deformed state in a plane perpendicular to the long axis Y of the connection device 1, while the retaining teeth 8b jointly lie on a cone because of their tilted position. With their inner retaining edges, the retaining teeth 8b define a circle relative to the long axis Y whose diameter is smaller in a non-deformed state than the outer diameter of the pipeline 2. As a result, the retaining edges act against the outer circumference of the inserted pipeline end 2a with a radial retaining force, in particular in a positive or at least frictional manner.

Figure 2A:
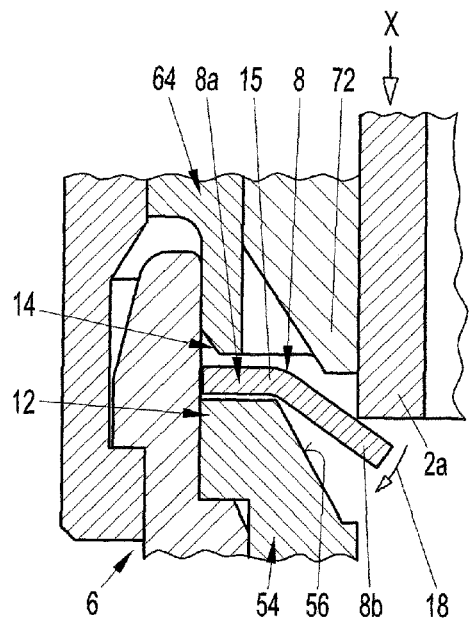
FIGS. 2a-2d are each an enlarged detail of area II in FIG. 1 in various states during the insertion of the line end.
Figure 2B:
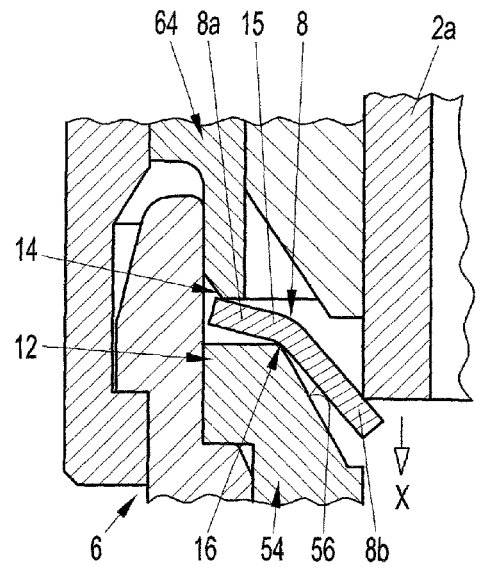
Figure 2C:
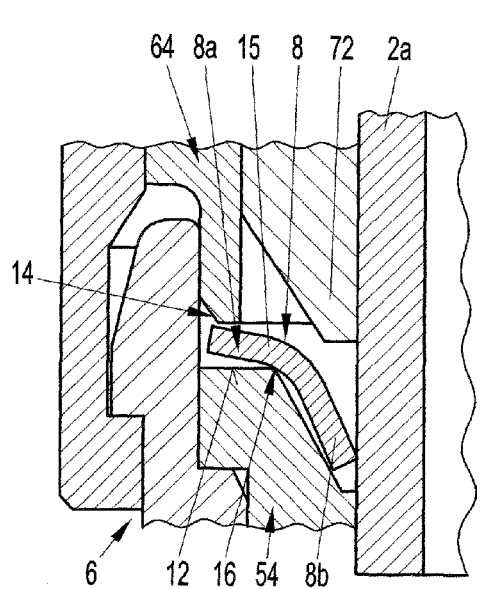
Figure 2D:
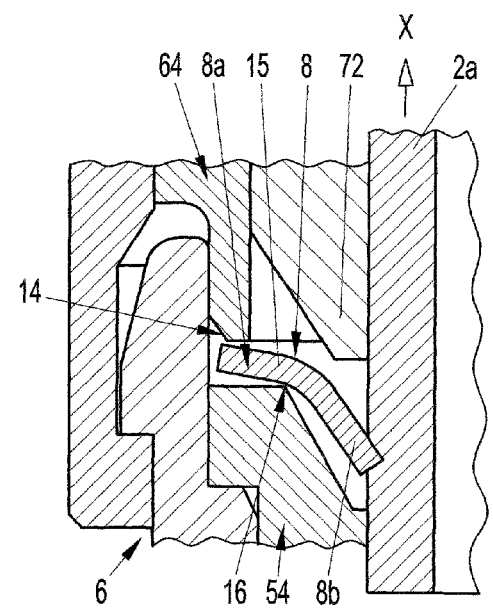

As is, in particular, apparent from the enlarged depictions in FIGS. 2a to 2d, according to the present invention, the toothed ring 8 is mounted inside the connecting element 6 with its outer circumferential area 8a having a defined limited axial freedom of movement in relation to the long axis Y. This axial freedom of movement is limited inside the connecting element 6 by contact sections 12 and 14 axially opposed on both sides. A first contact section 12 is configured on the "lower" side, (FIG. 1) viewed in the direction of insertion X, by a radial support surface that is perpendicular to the longitudinal axis Y, and a second support section 14 is arranged on the axially opposed "upper" side in the radially outer area of the toothed ring 8. The contact sections 12 and 14 are axially spaced apart from each other by a clear distance which is greater than the axially measured thickness of the circumferential area 8a of the toothed ring. The axial freedom of movement of the toothed ring 8 results from the difference: "distance of the contact sections 12, 14 minus the thickness of the circumferential area 8a of the toothed ring". Furthermore, the toothed ring 8 interacts on the angular transition 15 between the outer circumferential area 8a and the retaining teeth 8b with a circumferential tilting edge 16 provided inside the connecting element 6 on the radial inner circumference of the radial contact area forming the first contact section 12, such that on insertion of the line end 2a via its contact with the retaining teeth 8b see FIG. 2a in this respect the toothed ring 8 is swiveled or twisted around the tilting edge 16 in a seesaw manner from an initial position (FIG. 2a) pressed with its outer circumferential edge 8a against the first "lower" contact section 12, until the outer circumferential section 8a radially reaches the supported contact with the second axially opposed "upper" contact section 14 on the outer side. The swivel movement of the toothed ring 8 around the tilting edge 16 is illustrated in FIG. 2a by an arrow 18, and the reached contact position of the outer circumferential area 8a thereby attained is depicted in FIG. 2b. The outer radial circumference of the circumferential area 8a of the toothed ring swiveling in a seesaw manner around the tilting edge 16 consequently protrudes from the first contact section 12 and moves against the second contact section 14. When, starting from this position, the line end 2a is moved further in the direction of insertion X, a bending deformation occurs in the area of the tilting edge 16 of the retaining teeth 8b radially protruding inward, see FIG. 2c. The insertion procedure is then concluded by retracting the line end 2a against the direction of insertion X, see FIG. 2d. As a result, the retaining teeth 8b positively or at least frictionally intersect the outer circumference of the line end 2a.

Figure 3:
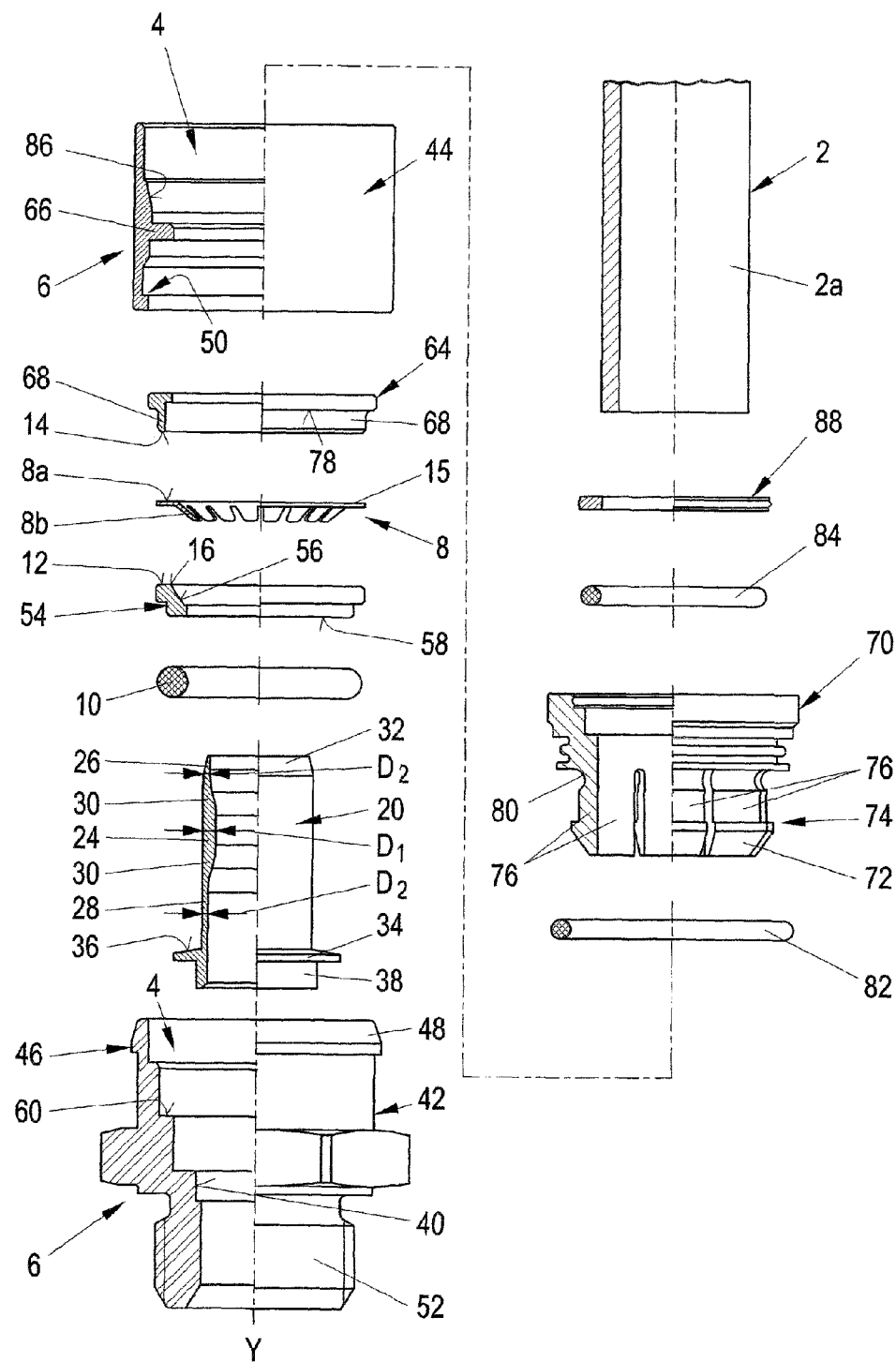
FIG. 3 is an exploded view of the connection device seen in FIG. 1, wherein the individual components are respectively depicted as a half axial sectional view.
Figure 4:
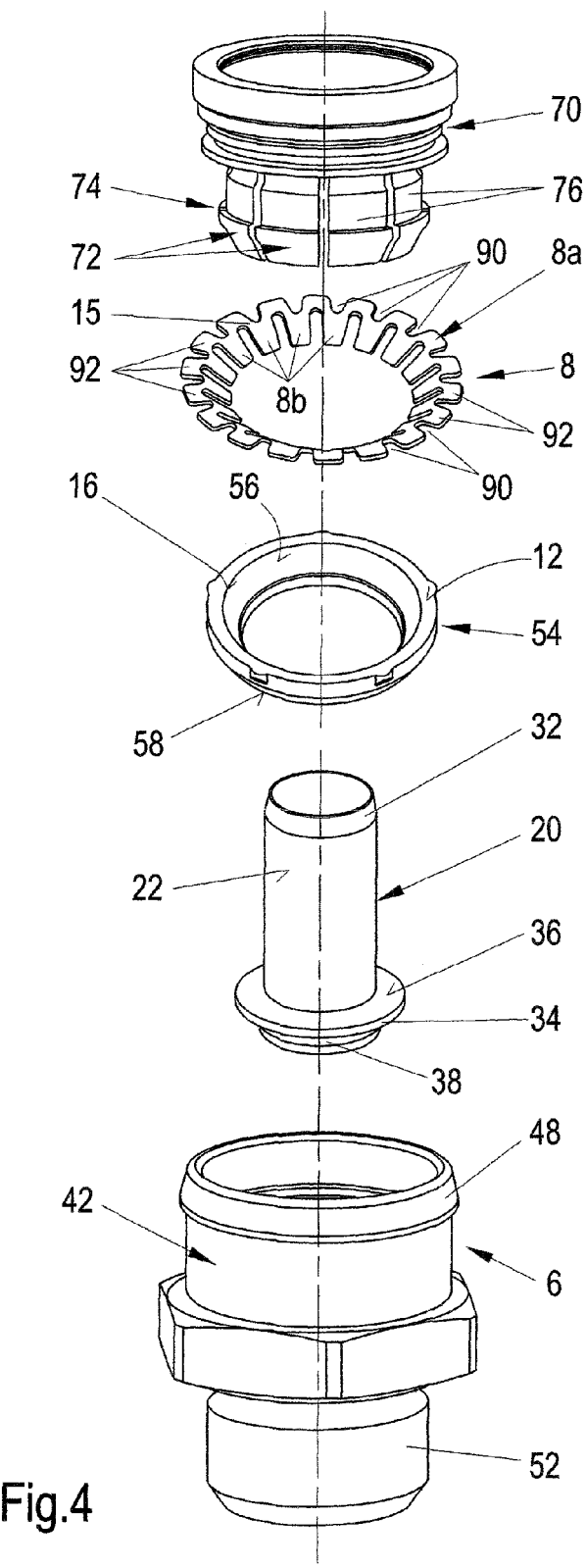
FIG. 4 is a perspective exploded view of several components of the connection device seen in FIG. 3, which in part does not have the same scale.

In addition, or also alternatively, to the embodiment according to the present invention described above, a support sleeve 20 is arranged inside the receiving opening 4 of the connecting element 6 coaxially to the long axis Y, such that the line end 2a can be slid onto a cylindrical outer surface 22 of the support sleeve 20 on insertion, also see FIGS. 3 and 4. As a result, the inserted line end 2a is radially supported by the support sleeve 20, so that when a radial retaining force generated by the toothed ring 8 is applied, deformations of the pipeline 2 are avoided in the operating area of the toothed ring 8. In this case, according to the present invention, it is provided that the support sleeve 20 has a support section 24 in the operating area of the toothed ring 8, wherein this support section 24 has a radially measured wall thickness D1 (see FIGS. 1 and 3) which, taking into consideration the properties of the material of the support sleeve 20, is designed such that the pipeline 2 is supported without radial deformation against the retaining forces occurring in the practice. The present invention further provides that the support sleeve 20 axially has a section with a reduced wall thickness D1 at least on one side, preferably, however, on both sides, of the support section 24, a sleeve section 26 and/or 28 with a reduced wall thickness D2 compared to wall thickness D1 to enlarge an effective inner flow cross-section. In the process, the inner circumferential area of the support section 24 and the adjacent sleeve sections 26, 28 preferably constantly merge into each other via the transition sections 30 such that the support sleeve 20 has an inner contour of the Venturi nozzle type. In this respect, reference is made to FIGS. 1 and 3. Compared to the wall thickness D2, the radially measured wall thickness D1 is greater by at least 0.3 mm to a maximum 0.6 mm.

On its free front end penetrating into the line end 2a the support sleeve 20 has an outer tilted insertion area 32, e.g. like a chamfer. In addition, the support sleeve 20 has a stop 34 on its area opposite the free front end held in the connecting element 6 as an insertion limit for the inserted or attached line end 2a. In an advantageous embodiment, the stop 34 has a conical contact area 36 for the line end 2a. This conical contact area 36 encompasses a cone angle α (see FIG. 1) with a radial plane perpendicular to the longitudinal axis Y in the range of 5° to 15° and in particular about 10°. This embodiment guarantees an automatic compensation of diagonally cut pipelines 2 which can thus be cut at an angle of up to 15°, which can, in particular, be compensated up to 10° by the preferred embodiment.

To mount the support sleeve 20 inside the connecting element 6 the support sleeve 20 has a cylindrical insertion section 38 which is inserted fitting into an inner receptacle 40 of the connecting element 6. In this case the stop 34 also functions as an insertion limit for the support sleeve 20.

Figure 5:
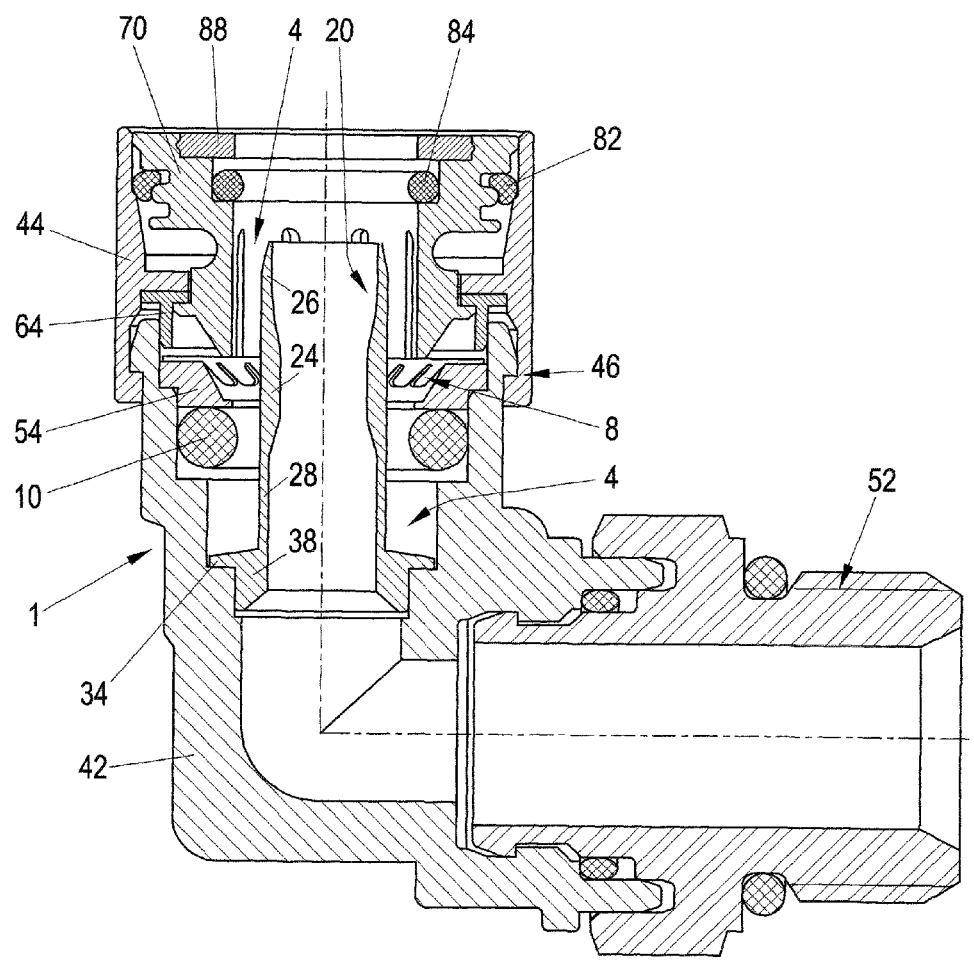
FIG. 5 is a depiction, similar to FIG. 1, of an alternative embodiment as an angular joint and without line ends.

In another advantageous embodiment of the connection device 1 according to the present invention, it is provided that the connecting element 6 has a housing axially divided in two parts with respect to the longitudinal axis Y, with a first, support-like housing part 42 pointing in the direction of insertion and a second, sleeve-like housing part 44 forming an outlet side of the receiving opening 4. The housing part 42 can be configured at will, e.g. as a distributor with a different number of outlets, a straight pass-through connector (FIG. 1), as well as an angular connector according to FIG. 5, or as an L, T or Y connector. The two housing parts 42, 44 are preferably connected to each other via a circumferentially closed snap-on connection 46, see in particular FIG. 1. For this purpose, in the depicted, preferred embodiment, the first housing part 42 engages axially and radially in a positive manner with an insertion section 48 in an inner groove-like locking recess 50 of the second housing part 44. The housing parts 42, 44 also interact in sections with a press-fit in order to guarantee a gap seal, in particular, as a dirt seal. The first housing part 42 can be configured as a screw-in socket with an outer thread attachment 52.

The tilting edge 16 for the toothed ring 8 described above can advantageously be configured with an insert ring 54 which preferably also has the first contact section 12 in the form of an end face adjacent radially outward to the tilting edge 16 and perpendicularly to the longitudinal axis Y. The tilting edge 16 is thus configured at the transition between the end face forming the first support section 12 and an inward adjacent conical area 56, in particular, also see FIG. 4.

The insert ring 54 is, in particular, inserted into the connecting element 6 with the press-fit, that is, preferably into its first housing part 42. In this case, it is also advantageously provided that the insert ring 54 inside the connecting element 6 delimits a sealing chamber 62 for the circumferential pipe seal 10 with a front face 58 pointing in the direction of insertion together with a flank area 60 of the connecting element 6 that is axially opposite it, or with the first housing part 42. The circumferential seal 10 preferably is an O-ring which preferentially consists of EPDM (ethylene-propylene-diene-monomer) or NBR (nitrile butadiene rubber=nitrile rubber) used in pressurized air pipelines and used for fuel pipelines made of a fluoroelastomer, which is available, e.g. under the trademark VITON, or silicone.

The insert ring 54 advantageously decouples the installation space for the retaining element 8 on the one hand, and the sealing element 10 on the other hand. Especially in combination with the support sleeve 20, eccentricities and ovalities of the pipeline 2 are avoided or compensated in the area between sealing and retaining. The insert ring 54 preferably consists of plastic, especially POM without fiberglass reinforcement, PBT or PA6.6, if applicable, with a 30% fiberglass content. Alternatively, the insert ring 54 can consist of metal, especially aluminum.

The second upper contact section 14 for the outer circumferential area 8a of the toothed ring 8 described above is preferably also formed on a ring-shaped insert element 64, which, according to FIG. 1, is supported inside the connecting element 6, that is, in particular, inside the second housing part 44 in the direction of the pipe detachment, on a retaining annular projection 66 protruding radially inward. In this connection, the second contact section 14 is formed by an end face of an axially protruding annular projection 68 of the support element 64, wherein this annular projection 68 preferably engages in the first housing part 42 or in its insert section 48. A press-fit to seal the gap can be provided as a dirt seal in this area between the housing part 42, 44 and the insert element 64.

A sleeve-shaped release element 70 is advantageously provided to release the inserted pipeline 2 locked via the toothed ring 8. This release element 70 engages in an axially displaceable manner in the connecting element 6 such that by inserting the release element 70 in the insertion direction X, the toothed ring 8 can be elastically deformed to release the line end 2a in the area of the retaining teeth 8b. To that end, the release element 70 acts against the retaining teeth 8b with the actuation sections 72. In this regard, reference is, in particular, made to FIG. 2d; when, starting from the locked position shown there, the release element 70 is moved downward in the direction of insertion X, the actuation sections 72 act against the retaining teeth 8b so that they are radially deformed outward, i.e. are spread and thus release the line end 2a for removal.

The release element 70 is preferably kept from disassembling inside the connecting element 6 via a lock 74. On its end pointing in the direction of insertion X, the release element 70 further has latching arms 76 formed by axial slits, which engage with retaining lugs pointing radially outward behind a radial step surface 78 (see FIG. 1) inside the connecting element 6, wherein this step surface 78 is advantageously formed on the insert element 64 (also see FIG. 3). In another advantageous embodiment, the latching arms 76 are circumferentially connected to the remaining closed ring part of the release element 70 via hinge-like constrictions 80, as a result of which the radial mobility of the latching arms 76 is favored.

Furthermore, the release element 70 on the one side has an outer circumferential seal 82 and on the other side an inner circumferential seal 84. The outer circumferential seal 82 serves to seal an annular gap between the sleeve-shaped release element 70 and the connecting element 6 or its second housing part 44. The inner circumferential seal 84 seals an annular gap toward the line end 2a. In a preferred embodiment, the outer circumferential seal 82 also functions as a spring element to produce an axial restoring force for the release element 70. For that purpose, the circumferential seal 82 acts against an inner, conically narrowing counter-surface 86 inside the connecting element 6 or the second housing part 44. The force to deform the outer circumferential seal 82 is at least equal or greater than the insertion force of the pipeline 2 through the inner circumferential seal 84, so that the release element 70 remains in position on the insertion of the pipeline 2, and thus does not change to the release position. The outer circumferential seal 82 is deformed more than the inner circumferential seal 84 on actuation of the release element 70 by means of a special grooved contour. As a result, the restoring force arises because of the outer circumferential seal 82. This spring effect can also be achieved by means of the properties of the material of the circumferential seals 82, 84. In this respect, the IRHD ("International Rubber Hardness Degree") of the outer circumferential seal 82 is at least equal or greater than the IRHD of the inner circumferential seal 84.

In the shown preferred embodiment a washer-shaped, cover-like, locking element 88 is provided to close a remaining, ring-shaped, partial opening of the receiving opening 4 encompassing the inserted pipeline 2 on the outlet side. According to FIG. 1, this locking element 88 also closes the area of the inner circumferential seal 84. As a result of this, the inner circumferential seal 84 can be inserted more easily into the release element 70, since there is no indentation in this area of the release element 70. Protection against a vapor stream is also attained by means of the locking element 88. In addition, the locking element 88 can also have at least one projection, which is not shown, protruding axially outward as a handle for the manual actuation of the release element 70.

Finally, it should be mentioned with reference to the illustration in FIG. 4 that the toothed ring 8 preferably configured as a stamped bent part of spring steel sheet is divided in its outer circumferential area 8a into a plurality of connection sections 92 connecting the retaining teeth 8b via recesses 90 radially opposite the retaining teeth 8b, i.e. adjacent radially outside to the retaining teeth 8b. These connection sections 92 are jointly in a plane perpendicular to the Y axis. As is apparent from FIG. 4, this preferred embodiment in a top view results in a meander-like zigzag course in the circumferential direction with the respectively alternating retaining teeth 8b and the connection sections 92 connecting them.

The invention has not been limited to the depicted and described exemplary embodiments but also includes all embodiments having the same effect within the meaning of the invention. It is expressly pointed out that the exemplary embodiments have not been limited to all combined characteristics, in fact, each individual partial characteristic can also be fundamental to the present invention independently of all other partial characteristics as such. Furthermore, the invention has not been limited to the combination of characteristics defined in the respective independent claim but can also be defined by any other combination of specific characteristics of all disclosed individual characteristics. This means that basically each individual characteristic of the respective independent claim may virtually be omitted and/or replaced by at least one individual characteristic disclosed at another point of the application. To this extent, the claims are to be merely understood as a first attempt at formulating the invention.

The invention claimed is:

1. A connection device for pipelines comprising:
    a connecting element having a receiving opening for a pipeline to be inserted with a line end and
    a retaining element mounted inside the receiving opening to lock the line end against extraction,
    wherein the retaining element is configured as a spring-elastic toothed ring with an outer circumferential area and with a plurality of retaining teeth arranged over an inner circumference extending radially inward and at an angle in a direction of insertion X and acting positively and/or frictionally against the line end,
    the toothed ring is mounted with the outer circumferential area having an axially limited freedom of movement defined by a first contact section and a second contact section axially opposed to the first contact section,
    wherein the toothed ring interacts at a transition between the outer circumferential area and the retaining teeth with a circumferential tilting edge provided inside the connecting element such that on insertion of the line end and contact with the retaining teeth, the toothed ring pivots around the tilting edge in a seesaw manner from a position where the outer circumferential area is pressed against the first contact section until the outer circumferential area contacts the second contact section, wherein the retaining teeth protruding radially inward over the tilting edge can be elastically deformed by bending, and
    wherein the connecting element further includes a housing axially provided as two parts with a first housing part pointing in the direction of insertion and a second housing part, wherein the first and second housing parts connected to each other via a circumferential snap-on connection.

2. A connection device according to claim 1, wherein the tilting edge is formed on an insert ring which also defines the first contact section as an end face adjacent radially outward of the tilting edge.

3. The connection device according to claim 2, wherein the insert ring includes an end face facing in the direction of insertion of the pipeline that together with an axially opposed surface of the connecting element delimits a sealing chamber inside the connecting element for a circumferential pipe seal.

4. A connection device according to claim 1, wherein the second contact section is defined by a ring-shaped insert element which is supported inside the connecting element in a direction opposite to the direction of insertion on an annular retaining projection of the connecting element that protrudes radially inward.

5. The connection device according to claim 1, further comprising a ring-shaped locking element configured to close partial opening of the receiving opening between the connection device and an inserted pipeline.

6. The connection device according to claim 1, wherein the toothed ring is configured as a stamped bent part made of spring steel sheet and is divided in the outer circumferential area into a plurality of connection sections connecting the retaining teeth via recesses radially opposite the retaining teeth.

7. The connection device according to claim 1, further comprising:

a support sleeve coaxially arranged inside the receiving opening of the connecting element in a region occupied by the retaining element and radially inward thereof, the support sleeve having a cylindrical outer surface on which the line end is adapted to be slid upon insertion, where in the region of the retaining element, the support sleeve has a support section with a wall thickness (D1) providing radial support of the line end against the radially inward retaining force of the retaining element, the support sleeve axially having a sleeve section with a reduced wall thickness on at least one side of the support section with a reduced wall thickness (D2) relative to the wall thickness (D1) of the support section to enlarge an effective inner flow cross-section of the support sleeve.

8. The connection device according to claim 7, wherein the support sleeve has sleeve sections with a reduced wall thickness (D2) on both axial sides of the support section.

9. The connection device according to claim 8, wherein an inner circumferential area of the support section and the adjacent sleeve sections continuously merge into each other via transition sections such that the support sleeve has an inner contour of a Venturi nozzle.

10. The connection device according to claim 7, wherein a free end of the support sleeve has a chamfered outer insertion area.

11. The connection device according to claim 10, wherein the support sleeve includes a stop configured to limit insertion of the line end, the stop being located in an area inside the connecting element opposite the free end of the support sleeve, the stop having a conical contact surface facing in a direction so as to engage the line end.

12. The connection device according to claim 11, wherein the conical contact surface encompasses a cone angle ($\alpha$) with a radial plane perpendicular to the insertion axis (Y) which is in the range of 5° to 15°.

13. The connection device according to claim 11, wherein the conical contact surface encompasses a cone angle ($\alpha$) with a radial plane perpendicular to the insertion axis (Y) at about 10°.

14. A connection device for pipelines comprising:
a connecting element having a receiving opening for a pipeline to be inserted with a line end and
a retaining element mounted inside the receiving opening to lock the line end against extraction,
wherein the retaining element is configured as a spring-elastic toothed ring with an outer circumferential area and with a plurality of retaining teeth arranged over an inner circumference extending radially inward and at an angle in the direction of insertion X and acting positively and/or frictionally against the line end,
the toothed ring is mounted with the outer circumferential area having an axially limited freedom of movement defined by a first contact section and a second contact section axially opposed to the first contact section,
wherein the toothed ring interacts at a transition between the outer circumferential area and the retaining teeth with a circumferential tilting edge provided inside the connecting element such that on insertion of the line end and contact with the retaining teeth, the toothed ring pivots around the tilting edge in a seesaw manner from a position where the outer circumferential area is pressed against the first contact section until the outer circumferential area contacts the second contact section, wherein the retaining teeth protruding radially inward over the tilting edge can be elastically deformed by bending, and
a sleeve-shaped release element in axial displaceable engagement with the connecting element such that the toothed ring is engageable and elastically deformable by axial displacement of the release element to release of the pipeline, the release element includes an outer circumferential seal that seals a ring gap toward the connecting element and includes an inner circumferential seal that seals a ring gap toward the pipeline.

15. The connection device according to claim 14, wherein the release element is retainingly engaged in the connecting element and kept against disassembly by a lock.

16. The connection device according to claim 14, wherein the outer circumferential seal is configured to bias the release element in an axial direction.

* * * * *